United States Patent
Padden et al.

(10) Patent No.: US 6,587,297 B1
(45) Date of Patent: Jul. 1, 2003

(54) SYSTEM AND METHOD FOR DETECTING THE PRESENCE OF A DATA-STORAGE CARTRIDGE USING PHASE-ROTATED POLARIZED LIGHT

(76) Inventors: Robin Reinhard Padden, Salt Lake City, UT (US); Kristin Anne McArdle Scott, Ogden, UT (US); Fred Charles Thomas, III, Ogden, UT (US)

( * ) Notice: Subject to any disclaimer, the term of this patent is extended or adjusted under 35 U.S.C. 154(b) by 0 days.

(21) Appl. No.: 09/506,637

(22) Filed: Feb. 18, 2000

(51) Int. Cl.[7] .............................................. G11B 19/10
(52) U.S. Cl. ........................................ 360/71; 360/133
(58) Field of Search ............................ 360/71, 69, 75, 360/133; 369/53.2

(56) References Cited

U.S. PATENT DOCUMENTS

| | | | |
|---|---|---|---|
| 5,128,914 A | * 7/1992 | Kurata et al. | 369/44.37 |
| 5,570,334 A | * 10/1996 | Kim | 369/110 |
| 5,638,228 A | 6/1997 | Thomas, III | 360/71 X |
| 5,650,891 A | 7/1997 | Thayne et al. | |
| 6,301,082 B1 | 10/2001 | Sonderegger et al. | 360/266.2 |

FOREIGN PATENT DOCUMENTS

| JP | 59203259 A | * 11/1984 |
|---|---|---|
| JP | 06290500 A | * 10/1994 |

OTHER PUBLICATIONS

O'Brien, D.C., et al., "Optical properties of a retroreflecting sheet," *Applied Optics*, 1999, 38(19), 4137–4144.

Park, B.C., et al., "Polarization properties of cube–corner retroreflectors and their effects on signal strength and non-linearity in heterodyne interferometers," *Applied Optics*, 1996, 35(22), 4372–4380.

Peck, E.R., "Polarization properties of corner reflectors and cavities," *J. Opt. Soc. Am.*, 1948, 38, 1015, 253–257.

\* cited by examiner

*Primary Examiner*—Andrew L. Sniezek
*Assistant Examiner*—James L Habermehl (57) ABSTRACT

A disk drive has an improved system for detecting the presence of a data-storage cartridge inserted into the drive. The improved system uses a source of polarized light and a detector of polarized light. The detector is optically coupled to the source by a reflective marker on the data-storage cartridge when the data-storage cartridge is inserted into the drive. The reflective marker rotates the polarization angle of the light which is incident upon its reflective surface. The detector is adapted to respond maximally to light that has been phase-rotated in a manner characteristic of the reflective marker. The detector acts in conjunction with an electrical circuit to allow the read/write heads of the disk drive to interface with the data-storage cartridge when the detector registers a maximal response.

27 Claims, 9 Drawing Sheets

SYSTEM AND METHOD FOR DETECTING THE PRESENCE OF A DATA-STORAGE CARTRIDGE USING PHASE-ROTATED POLARIZED LIGHT

FIELD OF THE INVENTION

The present invention relates to an improved system and method for detecting the presence of a data-storage cartridge that is compatible with a particular type of disk drive. More particularly, the invention relates to a system and a method that utilize phase-rotated polarized light to detect the presence of a compatible data-storage cartridge.

BACKGROUND OF THE INVENTION

Removable data-storage cartridges are commonly used to store digital information. Removable data-storage cartridges are utilized in conjunction with some type of disk drive that writes and reads the digital information to and from one or more recording surfaces on the medium. Removable data-storage cartridges can easily be inserted into and removed from the disk drive by the drive's user, thereby allowing the drive to be utilized with different individual cartridges on a routine basis.

Data-storage cartridges typically comprise an outer casing, or shell, that houses a rotatable recording medium, or disk, upon which digital information is stored. The shell commonly includes upper and lower halves that are joined together to house the disk. The disk is mounted on a hub that rotates freely within the shell. The hub is adapted to engage a spindle motor of a disk drive when the cartridge is inserted into the drive. Activation of the spindle motor rotates the disk via the hub.

A disk drive typically writes or reads data to and from the disk's recording surface through the use of one or more data-transducing heads. The outer shell of the cartridge usually has some form of opening near its forward edge to provide the heads with access to the recording surface. Some type of shutter or door mechanism is often provided to cover the access opening when the cartridge is not in use, thereby preventing dust and other contaminants from entering the cartridge and settling on the recording surface of the disk. (A particular type of data-storage cartridge has been described herein for exemplary purposes only; the term "data-storage cartridge," as used throughout the specification and claims, is intended to encompass all types of data storage devices, including tape cartridges.)

Disk drives typically comprise an actuator that positions the data-transducing heads proximate the recording medium. The actuator should not be permitted to translate unless a data-storage cartridge that is compatible with the disk drive is installed in the-drive. In particular, translation of the actuator should not be permitted unless a data-storage cartridge having an appropriate form factor, i.e., outer dimensions and geometry, is present in the drive. Movement of the actuator in the presence of a foreign object can damage the actuator and the data-transducing heads. (The term "foreign object," as used throughout the specification, refers to data-storage cartridges having a form factor that is incompatible with a particular drive, and objects other than data-storage cartridges.) Furthermore, movement of the actuator in the presence of an incompatible data-storage cartridge can corrupt the data that is stored on the cartridge.

Most removable-media drives utilize data-storage cartridges having similar form factors. Additionally, many types of foreign objects other than incompatible data-storage cartridges are easily inserted into disk drives. Thus, removable-media disk drives commonly require some type of mechanism for detecting the presence of a compatible data-storage cartridge within the drive. In particular, the mechanism should be able to discriminate between compatible data-storage cartridges and foreign objects.

Removable-media disk drives commonly include mechanical switches that detect the presence of a data-storage cartridge within the drive. These switches are typically positioned so that the complete insertion of a data-storage cartridge into the drive causes the cartridge to contact the switch, thereby producing an indication that a cartridge is present within the drive.

Cartridge-detection systems that use reflective materials have been developed and patented. For example, U.S. Pat. No. 5,638,228 ("the '228 patent") describes one such system. The '228 patent issued on Jun. 10, 1997, and is incorporated herein by reference in its entirety. The '228 patent describes a data-storage cartridge comprising a marker formed from a retro-reflective material. The retro-reflective marker is disposed on an outer shell of the cartridge. The '228 patent also discloses a disk drive that employs a light emitter and a light detector coupled to an electrical circuit. These components determine whether a compatible data-storage cartridge is present in the drive by sensing the presence of the retro-reflective marker.

The light emitter described in the '228 patent directs radiant energy, i.e., light, at the retro-reflective marker. A portion of the light that is incident upon the marker is reflected back toward the light source, i.e., the emitter. The detector is positioned proximate the emitter, and senses the intensity of the reflected light.

The amount of incident light reflected by a retro-reflective marker is greater than the amount of light reflected by most other objects under similar conditions. The retro-reflective marker thus generates a relatively strong reflection when illuminated by light from the emitter. Hence, by sensing that an amount of light reflected from an object inserted into the disk drive exceeds a predetermined threshold, the detector and the electrical circuit can generally recognize the presence of a data-storage cartridge equipped with a retro-reflective marker.

The electrical circuit permits movement of the drive's actuator when the amount of light incident upon the detector exceeds the predetermined threshold. The electrical circuit thereby allows the data-transducing heads to interface with the data-storage cartridge. Conversely, amounts of reflected light that do not reach the predetermined threshold are interpreted by the electrical circuit as an indication that a compatible data cartridge is not present in the drive. Hence, the electrical circuit does not permit movement of the actuator under such circumstances.

The system described in the '228 patent has proven to be effective in detecting the presence of compatible data-storage cartridges within disk drives. Under certain limited circumstances, however, the '228 system permits activation of the drive's actuator in the presence of specific types of foreign objects. Activation occurs under these circumstances because a relatively limited number of materials have surface reflectivities similar to or greater than that of the retro-reflective marker. Hence, objects formed from these materials, when inserted into a disk drive equipped with the '228 system, are recognized by the drive as a compatible data-storage cartridge.

As is evident from the above discussion, a need exists for a cartridge-detection system that provides a greater degree of differentiation between compatible data-storage cartridges and certain types of foreign objects. The present invention is directed to this and other goals.

SUMMARY OF THE INVENTION

An object of the present invention is to provide a disk drive having an improved ability to discriminate between compatible data-storage cartridges and foreign objects within the disk drive. In accordance with this object, a presently-preferred embodiment of the invention comprises a disk drive that includes a source of polarized light and a detector being in selective optical communication with the source of polarized light. The detector detects polarized light having predetermined characteristics. The detector preferably comprises a polarizing filter. The polarizing filter is in selective optical communication with the source of polarized light.

In one particular embodiment of the invention, the source of polarized light emits polarized light having first polarization angle, and the detector is adapted to respond maximally to polarized light having a second polarization angle. In a further embodiment, the disk drive is adapted to receive a data-storage cartridge having a retro-reflective marker. The retro-reflective marker places the source of polarized light and the detector in optical communication when the disk drive receives the data-storage cartridge. The retro-reflective marker rotates the polarization angle of the polarized light emitted by the source of polarized light from the first polarization angle to approximately the second polarization angle.

Further in accordance with the above-noted object, the invention provides a data-storage system comprising a disk drive that includes a source of polarized light and a light detector. The data-storage system also comprises a data-storage cartridge adapted for insertion into the disk drive. The data-storage cartridge comprises a reflective marker that forms an optical path between the source of polarized light and the light detector when the data-storage cartridge is inserted into the disk drive.

In one particular embodiment of the invention, the source of polarized light emits polarized light having a first polarization angle and the light detector is adapted to respond maximally to polarized light having a second polarization angle. The reflective marker preferably rotates a polarization angle of the light emitted by the source of polarized light from the first polarization angle to approximately the second polarization angle.

Another object of the present invention is to provide an improved method for discriminating between compatible data-storage cartridges and foreign objects within a disk drive. In accordance with this object, a method for detecting the presence of a data-storage cartridge in a disk drive comprises the step of directing polarized light at a reflective marker disposed on the data-storage cartridge. The method further comprises the steps of measuring an amount of the polarized light that is reflected by the marker, and determining whether the amount of reflected light exceeds a predetermined threshold.

BRIEF DESCRIPTION OF THE DRAWINGS

The foregoing summary, as well as the following detailed description of the preferred embodiments, is better understood when read in conjunction with the appended drawings. For the purposes of illustrating the invention, there is shown in the drawings an embodiment that is presently preferred, it being understood, however, that the invention is not limited to the specific methods and instrumentalities disclosed. In the drawings.

DESCRIPTION OF THE PREFERRED EMBODIMENTS

Figure 1:
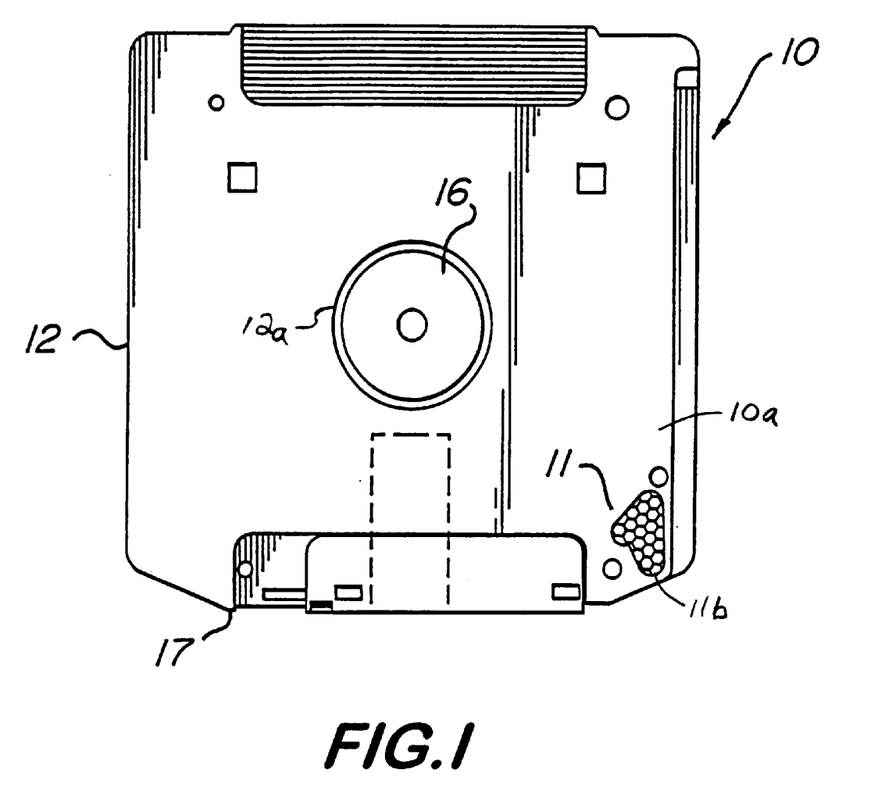
FIG. 1 shows a data-storage cartridge for use with the present invention.

FIG. 1 illustrates a data-storage cartridge 10 that is capable of being used in conjunction with the present invention. Data-storage cartridge 10 is described in detail in commonly-assigned U.S. Pat. No. 5,650,891 entitled "Apparatus for Performing Multiple Functions in a Data Storage Device Using a Single Electro-Mechanical Device," which issued on Jun. 22, 1997 and is hereby incorporated by reference in its entirety. Cartridge 10 is described herein for exemplary purposes only; the invention can also be used in conjunction with data-storage cartridges of other types, sizes, and shapes.

Data-storage cartridge 10 comprises upper and lower shells that mate to form an outer casing 12. Cartridge 10 also includes a disk hub 16 and a disk-shaped recording medium (not shown) fixed to hub 16. Hub 16 and the recording medium are rotatably mounted in outer casing 12. An opening 12a on the bottom shell of casing 12 provides access to hub 16. An opening (not shown) in a front peripheral edge 17 of cartridge 10 provides access to the recording medium.

Figure 2:
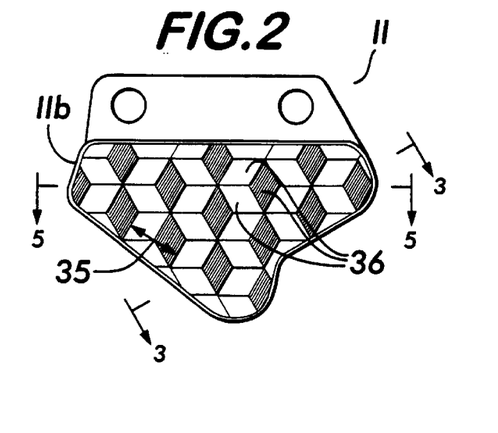
FIG. 2 is a view of a front surface of a retro-reflective marker of the data-storage cartridge shown FIG. 1.
Figure 2A:
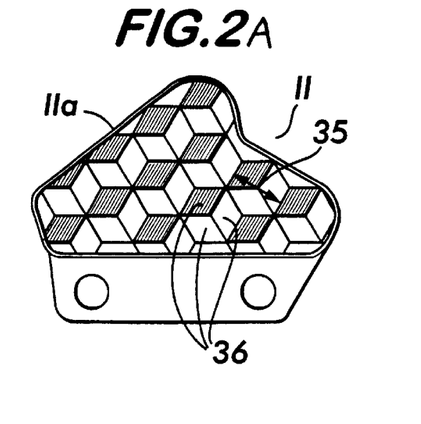
FIG. 2A is a view of a back surface of the retro-reflective marker shown in FIG. 2.
Figure 3:
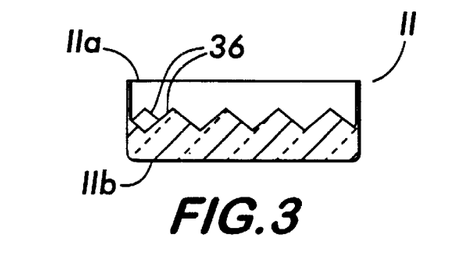
FIG. 3 is a cross-sectional view along the line 3—3 shown FIG. 2.
Figure 4:
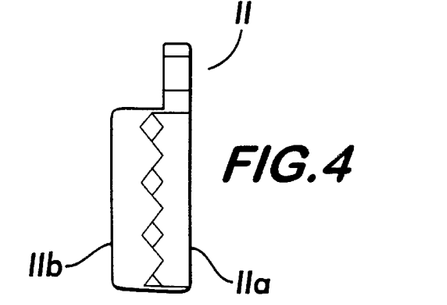
FIG. 4 is an edge view of the retro-reflective marker shown in FIGS. 2, 2A, and and 3.
Figure 5:
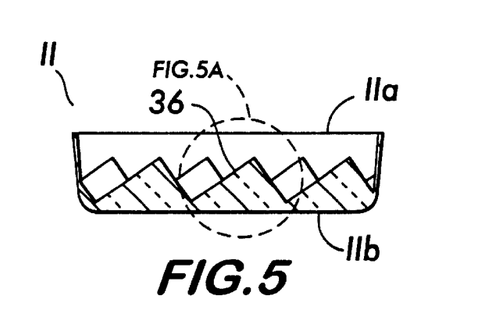
FIG. 5 is a cross-sectional view along the line 5—5 shown in FIG. 2.
Figure 5A:
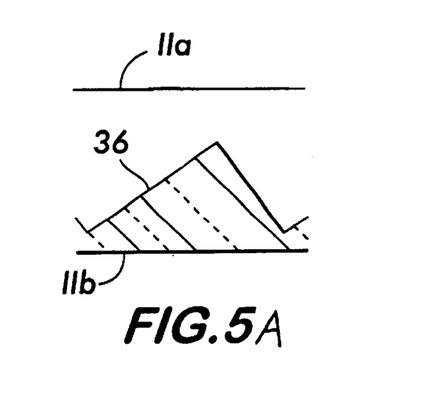
FIG. 5A is magnified view of the area designated "FIG. 5A" in FIG. 5.

Data-storage cartridge 10 further comprises a reflective marker 11. Reflective marker 11 is mounted in cartridge 10 in a manner that causes a bottom surface 11b of reflective marker 11 to lie substantially flush with a bottom surface 10a of cartridge 10. Preferably, reflective marker 11 is a retro-reflective marker made from molded optically-reflective plastic. Most preferably, reflective marker 11 is a retro-reflective marker comprising an array of corner cubes 35, as illustrated in FIGS. 2 through 5A. Each corner cube 35 of marker 11 comprises a plurality of flat, reflective panels 36. A set of similarly-oriented panels 36 is selectively shaded in FIGS. 2 and 2A for illustrative purposes.

Figure 6:
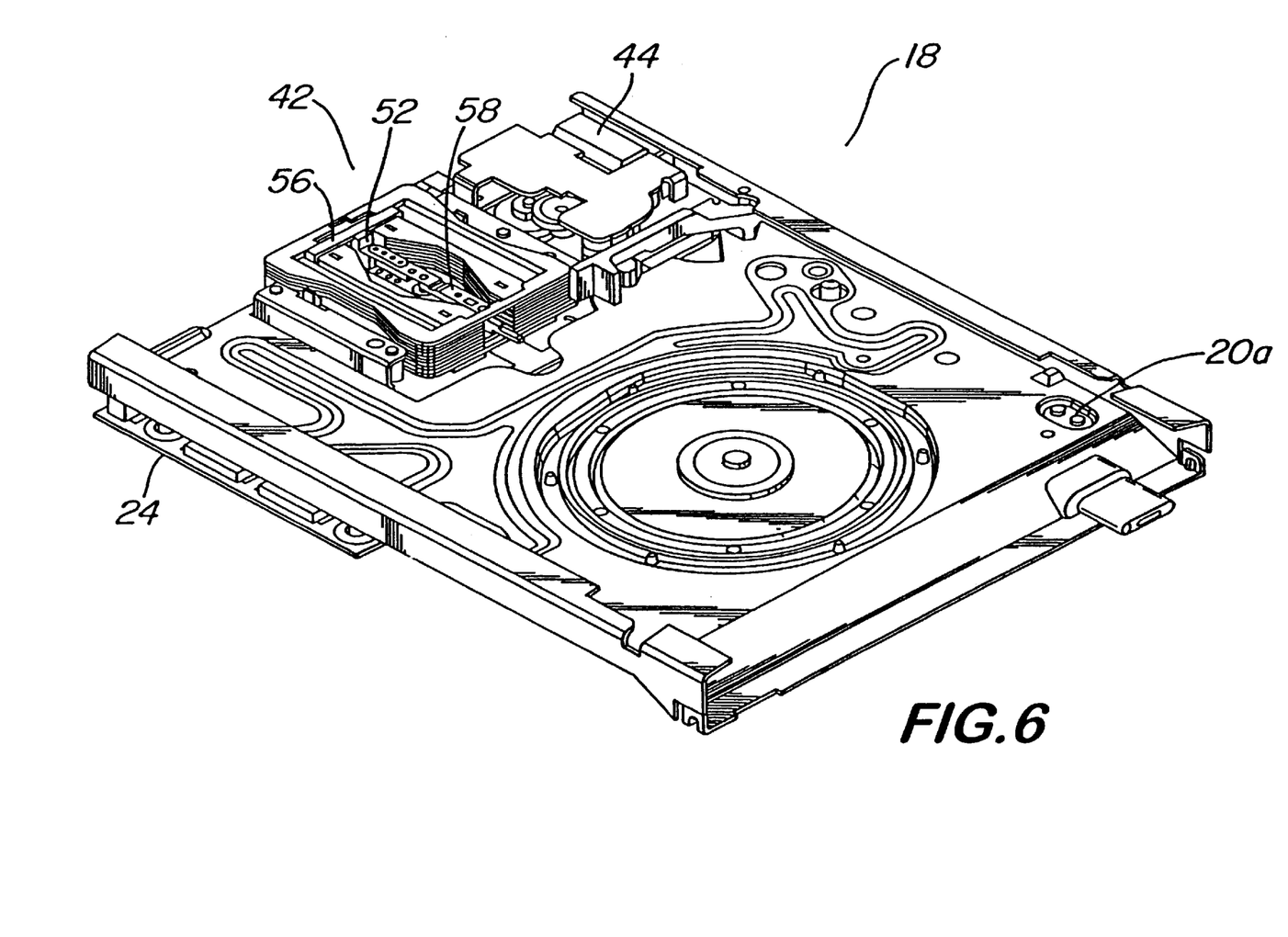
FIG. 6 is a top perspective view of a disk drive in accordance with the present invention.
Figure 6A:
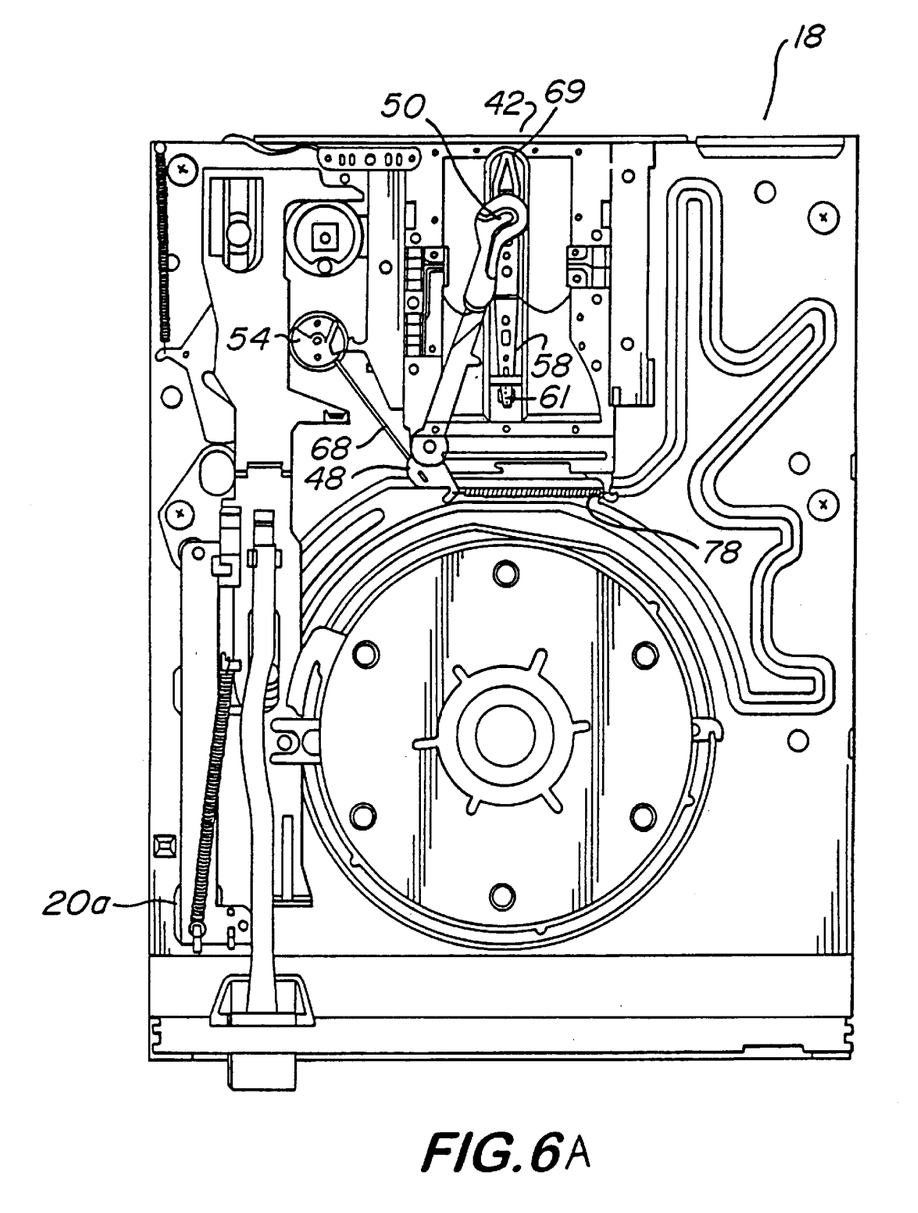
FIG. 6A is a bottom plan view of the disk drive shown in FIG. 6.

FIGS. 6A and 6B illustrate an exemplary disk drive 18 that incorporates various aspects of the invention. Disk drive 18 comprises an emitter-detector pair 20, data-transducing heads 61, and a head-retraction system 42. Disk drive 18 also comprises an electrical circuit 23 (see FIG. 9). Head-retraction system 42 and other components of disk drive 18 are described in a commonly-assigned, co-pending application entitled "An Improved Operating System For Operating An Eject System And A Head Retraction System Of A Disk Drive," Ser. No. 08/866,189, which was filed on May 30, 1997 and is incorporated herein by reference in its entirety.

Figure 7A:
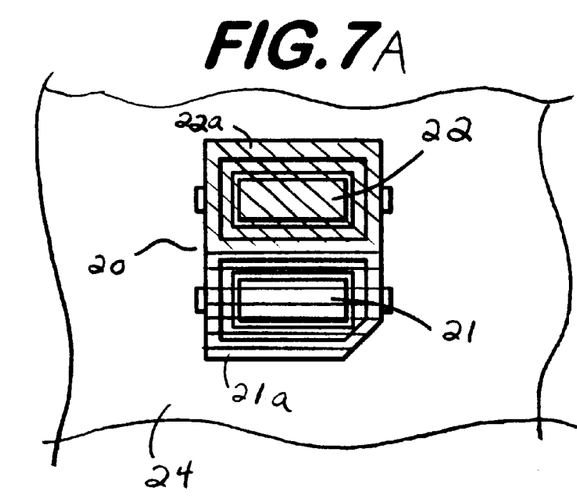
FIG. 7A is a top view of an emitter/detector pair for use in the disk drive shown in FIGS. 6 and 6A.
Figure 7B:
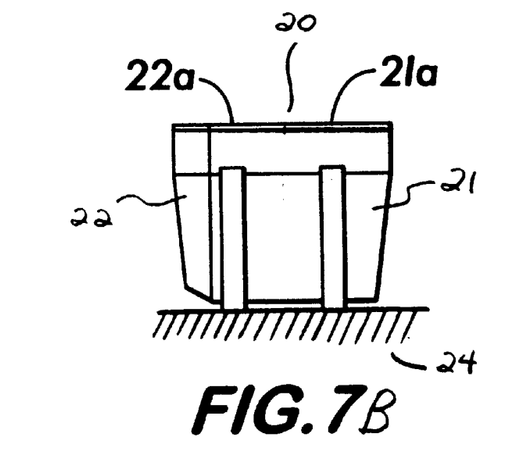
FIG. 7B is a side view of the emitter/detector pair shown in FIG. 7A.
Figure 8:
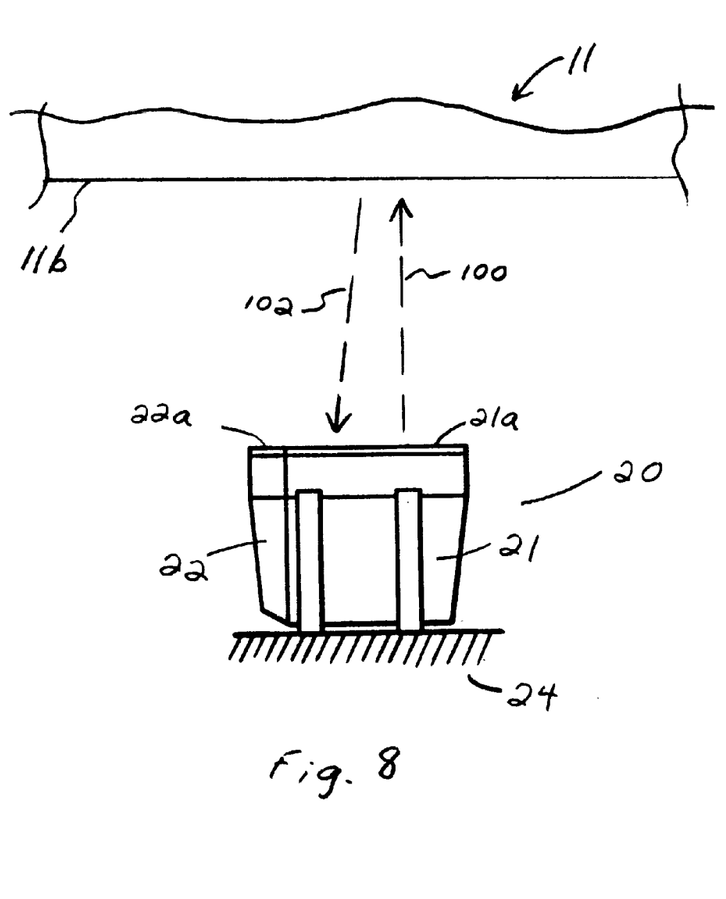
FIG. 8 is a diagrammatical illustration of the emitter/detector pair shown in FIGS. 7A and 7B, the retro-reflective marker shown in FIGS. 2–5A, and the paths of incident and reflected light between the emitter-detector pair and the retro-reflective marker.

Emitter-detector pair 20 is disposed on a printed circuit board (PCB) 24. Emitter-detector pair 20 is utilized to detect the presence of retro-reflective marker 11 on cartridge 10. Emitter-detector pair 20 includes a light emitter 21 and a light detector 22. Emitter 21 and detector 22 are positioned side by side, as shown in FIGS. 7A, 7B, and 8. Emitter 21 comprises a light-emitting diode (LED), e.g., a laser diode, that functions as a source of radiant energy. The radiant energy emitted by the LED preferably has a wavelength within a range of approximately 400 nanometers to 1100 nanometers. (The term "light," as used throughout the specification and claims, is intended to encompass all forms of radiant energy, and is not limited to visible light.)

Detector 22 comprises a solid-state photonic detection device, e.g., a phototransistor or a photodiode. Emitter 21 and detector 22 are optically coupled by retro-reflective marker 11 when cartridge 10 is inserted into drive 18. Detector 22 is electrically coupled to electrical circuit 23 (see FIG. 9). Detector 22 and electrical circuit 23 operate in conjunction to activate head-retraction system 42 when a compatible data-storage cartridge such as cartridge is inserted into drive 18. More specifically, circuit 23 activates head-retraction system 42 when an amount of light above a predetermined threshold is incident upon detector 22. This threshold is referred to throughout the specification and claims as the "activation threshold" of head-retraction system 42. Activation of head-retraction system 42 allows data-transducing heads 61 to interface with the recording medium of cartridge 10. Specific details concerning the activation of head-retraction system 42 are presented below.

A polarizing filter is disposed along the optical path of emitter 21. In the exemplary embodiment, the polarizing filter is a polarizing element 21a incorporated into detector 21. (Alternative embodiments of the invention may forgo the use of a polarizing filter along the optical path of emitter 21, as explained in detail below.)

A polarizing filter is likewise disposed along the optical path of detector 22. In the exemplary embodiment, this polarizing filter is a polarizing element 22a incorporated into detector 22. Preferably, polarizing elements 21a and 22a each have a spectral bandwidth that encompasses the entire emission bandwidth of emitter 21, i.e., elements 21a and 22a each have a bandwidth within a range of approximately 400 nanometers to 1100 nanometers. These specific types of polarizing filters are described for exemplary purposes only; other types of polarizing filters can be utilized in alternative embodiments of the invention.

Applicants have discovered that the use of linearly-polarized light enhances the ability of disk drive 18 to discriminate between compatible data-storage cartridges and foreign objects inserted into drive 18. In particular, the polarization angle of linearly-polarized light is rotated upon being reflected from the surface of certain types of materials, e.g., retro-reflective materials. The present invention exploits this phenomenon in the following manner to enhance the ability of disk drive 18 to discriminate between compatible data-storage cartridges and foreign objects.

Linearly-polarized light reflected from the surface of a retro-reflective marker such as marker 11 experiences a rotation of its polarization angle, as noted above. The polarization-angle rotation caused by retro-reflective marker 11 is substantially unique to this type of reflective marker. More specifically, retro-reflective marker 11 phase retards linearly-polarized light reflected from its surface in a highly distinct manner. Applicants have found the magnitude of this phase rotation to be approximately fifty degrees for the preferred embodiment of the marker 11 shown in FIGS. 2 through 5A.

The noted polarization-angle rotation caused by retro-reflective marker 11 is a result of the internal reflections that incident light undergoes within corner cubes 35. The magnitude of the polarization-angle rotation is a function of the index of refraction of the corner cube material, the geometry of the reflective path within corner cube 35, and the index of refraction of the air along the reflective path. This phenomenon is well known, and is described in detail in the following articles: "Polarization Properties of Corner Reflectors and Cavities," by E. R. Peck, Journal of the Optical Society of America, Vol. 12., No. 3, Mar. 1962; "Polarization Properties of Cube-Corner Retroreflectors and Their Effects on Signal Strength and Nonlinearity in Heterodyne Interferometers," by B. C. Park, T. B. Eorn, and M. S.

Chung, Applied Optics, Vol. 35, No. 22, Aug. 1, 1995; and "Optical Properties of a Retroreflecting Sheet," D. C. O'Brien, G. E. Faulkner, and D. J. Edwards, Applied Optics, Vol. 38, No. 19, Jul. 1, 1999.

Furthermore, various coatings may be applied to retro-reflective marker 11 to attenuate or increase the magnitude of the polarization-angle rotation. For example, the application of a birefringent plastic film to reflective panels 36 of marker 11 will alter the magnitude of the polarization-angle rotation caused by marker 11.

The invention utilizes the unique polarization-angle rotation caused by retro-reflective marker 11 to enhance the ability of drive 18 to discriminate between compatible data-storage cartridges and foreign objects. In particular, drive 18 is configured so that detector 22 registers a maximal response in the presence of light that has had its polarization angle rotated in a manner characteristic of the rotation caused by a retro-reflective marker such as marker 11.

The response of detector 22 is maximized through the use of polarizing elements 21a and 22a. FIG. 8 is a diagrammatical representation showing the relative positions of elements 21a and 22a, emitter 21, detector 22, and data-storage cartridge 10 within disk drive 18. FIG. 8 also includes a representation of the light emitted by emitter 21 (arrow 100), and a representation of the light that is subsequently reflected by cartridge 10 toward detector 22 (arrow 102).

Emitter 21 functions as a source of light, as noted previously. The light produced by emitter 21 is directed through polarizing element 21a, as is shown in FIG. 8. Element 21a linearly polarizes the light in a predetermined manner. In particular, element 21a polarizes the light produced by emitter 21 so that the polarization angle of the light has a predetermined value after passing through element 21. The significance of this function is explained below.

The linearly-polarized light that passes through element 21a is directed toward retros reflective marker 11 on data-storage cartridge 10 (see arrow 100). A portion of the light which is incident upon marker 11 is reflected back toward emitter-detector pair 20 (see arrow 102). Marker 11 phase retards the reflected light, as noted previously.

A portion of the light reflected by marker 11 is incident upon polarizing element 22a (see arrow 102). The reflected light passes through polarizing element 22a and then enters detector 22. Detector 22 generates an electrical output in response to this light. The electrical output of detector 22 is proportional to the amount of light that enters detector 22.

Element 22a can be configured to optimally transmit light that has been polarized in a particular manner. Optimal transmission is achieved by aligning, i.e., matching, the polarization angle of element 22a with the polarization angle of the light which is incident upon element 22a. In other words, a maximal amount of light will pass through element 22a when the polarization angle of element 22a matches the polarization angle of the incident light. Conversely, light that does not have a polarization angle matching that of element 22a will not pass through element 22a in a maximal amount. Hence, detector 22, which is positioned behind element 22a in relation to the reflective source, will register a comparatively high response when element 22a is illuminated by light having a polarization angle matching that of element 22a.

Drive 18 is configured so that detector 22 registers a maximal response to light that has been polarized in a manner characteristic of retro-reflective marker 11. Specifically, the polarization angle of detector element 22a is substantially matched to the polarization angle of the light that has been reflected from marker 11. Hence, the polarization angle of element 22a is offset by approximately fifty degrees from the polarization angle of the light that is incident upon marker 11 (fifty degrees represents the polarization-angle rotation imposed on the reflected light by marker 11). Hence, the respective polarization angles of elements 21a and 22a are offset by approximately fifty degrees.

The above-described configuration of emitter 21 and detector 22 causes element 22a to maximally transmit light that has been reflected from a retro-reflective marker such as marker 11. In other words, element 22a maximally transmits linearly-polarized light that has experienced a polarization-angle rotation of approximately fifty degrees in relation to its polarized state upon leaving emitter 21. Hence, detector 22 registers a maximal response when light that has been reflected by retro-reflective marker 11 is incident upon detector 22. Conversely, detector 22 does not register a maximal response when light that has been reflected by substantially all other types of objects is incident upon detector 22. Thus, the activation threshold for head-retraction system 42 can be set at a level high enough to prevent the activation of system 42 in the presence of substantially all objects other than a retro-reflective marker such as marker 11.

Detector 22 and electrical circuit 23 are used to control the operation of head-retraction system 42, as noted previously. Electrical circuit 23 includes a voltage source ($V_{cc}$), a limiting resistor 32 that limits the voltage of detector 22, and a resistor 33 disposed between detector 22 and ground (see FIG. 9). Electrical circuit 23 produces an output voltage ($V_{out}$). $V_{OUT}$ is directed to a microprocessor 35. Microprocessor 35 permits data-transducing heads 61 to move (and thus interface with the recording medium of cartridge 10) when $V_{out}$ reaches a pre-determined range of values. Specifically, microprocessor 35 activates a motor 44 in head-retraction system 42. Motor 44 causes head-retraction system 42 to move from its retracted position to a position from which heads 61 interface with the recording medium. Head-retraction system 42 otherwise remains in its retracted position.

Figure 9:
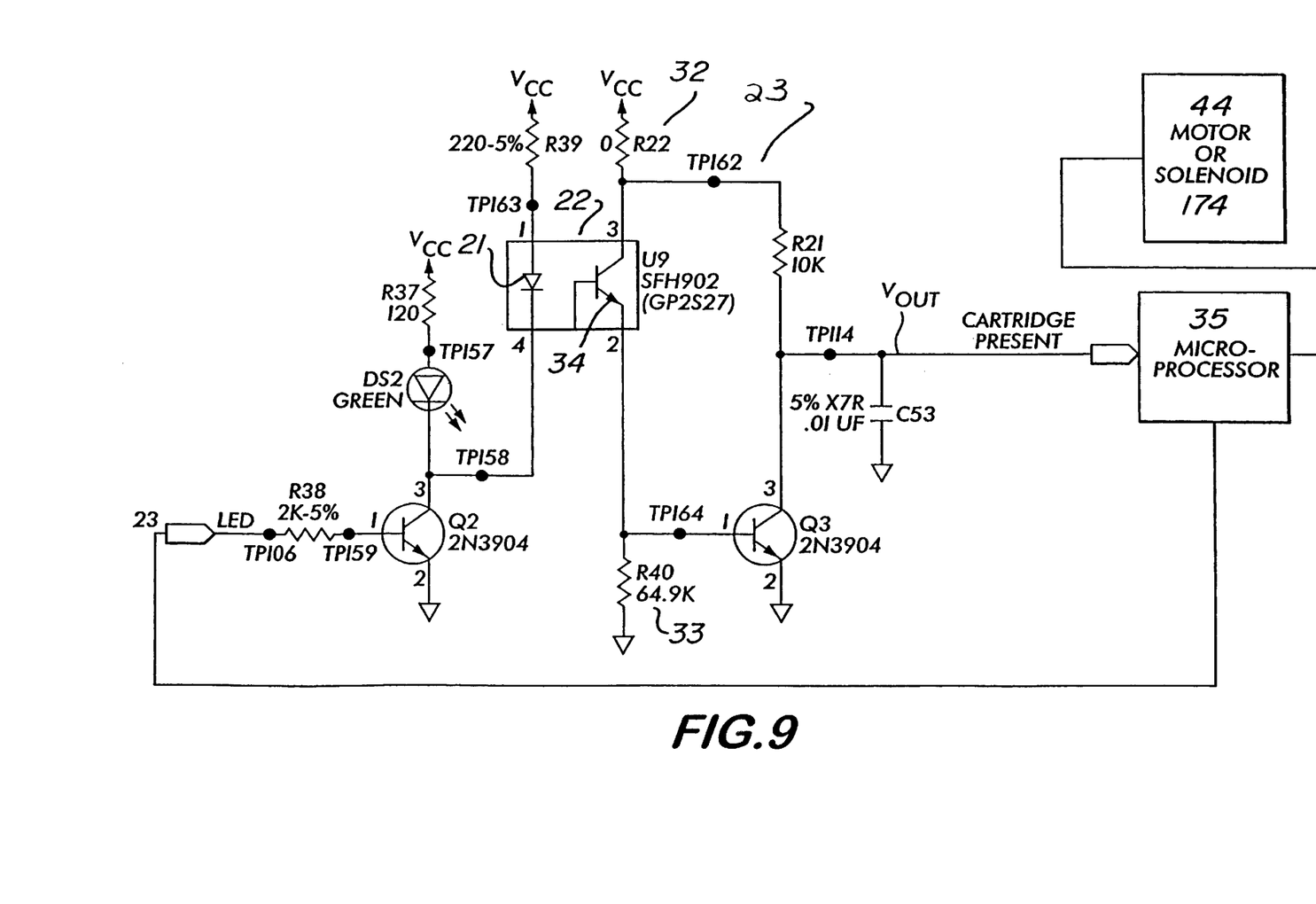
FIG. 9 is an schematic illustration of an electrical circuit of the disk drive shown in FIGS. 6 and 6A.

Emitter 21 and detector 22 become optically coupled via the refection from marker 11 when cartridge 10 is inserted into drive 18, as noted above. The optical coupling of emitter 21 and detector 22 causes the amount of electrical current conducted by detector 22 to vary. In particular, the amount of electrical current conducted by detector 22 increases in proportion to the amount of light that is incident upon detector 22. In addition, the increased current conducted by detector 22 causes a transistor 34 within circuit 23 to begin to conduct current. The increased current levels in detector 22 and transistor 34 cause $V_{out}$ to cross into a range of values under which microprocessor 35 will permit activation of head-retraction system 42.

Conversely, the presence of a foreign object in disk drive 18 will not, in general, cause $V_{out}$ to cross into a range of values under which microprocessor 35 permits activation of heads 61. Specifically, an amount of light is incident upon detector 22 after being reflected by the foreign object and passing through element 22a, as noted previously. In general, this amount of light is insufficient to increase the amount of electrical current conducted by detector 22 above the level needed to activate head-retraction system 42. Most notably, foreign objects having surface reflectivities greater than that of marker 11 will not, in general, reflect enough light to activate head-retraction system 42. This operating characteristic results from the use of elements 21a and 22a. In particular, element 22a inhibits the transmission of light that has not been polarized in the unique manner characteristic of retro-reflective marker 11, as explained previously. Hence, the activation threshold for head-retraction system 42 is set within a range for $V_{out}$ that, in general, can only be attained when light that has been reflected from a retro-reflective marker such as marker 11 is incident upon detector 22.

Further details concerning electrical circuit 23 and head-retraction system 42 are as follows. Limiting resistor 32 preferably has a resistance of 10K-ohms with a tolerance of +/-5%. Transistor 34 is a 2N3904 transistor having a +/-50% tolerance on its Beta. Emitter-detector pair 20 has a 2:1 range for photo transistor output current given a particular reflective target. The optical elements in marker 11 have a maximum variance range of approximately twenty percent in their reflective efficiencies.

Head retraction system 42 includes motor 44, a head crank 54, a drive link 48, a trolley 50, a linear actuator 52, and a head spring 78. These components operate in conjunction to hold data-transducing heads 61 in a parked position when a compatible data-storage cartridge such as cartridge 10 is not present within disk drive 18.

Linear actuator 52 includes a carriage assembly 56, a load beam 58, a head gimbal assembly (not shown), and heads 61. Load beam 58 is preferably welded to the head gimbal assembly, and heads 61 are mounted on an end of the head gimbal assembly. Load beam 58, the head gimbal assembly, and heads 61 are mounted on carriage assembly 56. Carriage assembly 56 is translatably mounted in disk drive 18. Specifically, carriage assembly 56 is free to translate toward the front and the back of drive 18. Carriage assembly 56 has a post 69 that engages trolley 50.

Head crank 54 is coupled to motor 44 by a gearing system. The gearing system transmits power from motor 44 to rotate head crank 54. Head crank 54 is connected to drive link 48 by a wire 68 or a similar device. Drive link 48 is rotatably mounted to disk drive 18. Wire 68 and head spring 78 are attached to opposing longitudinal ends of drive link 48.

Rotation of head crank 54 causes a torque to be applied to drive link 48. This torque exceeds the countering torque exerted by head spring 78. The resulting rotation of drive link 48 causes trolley 50, carriage assembly 56, and data-transducing heads 61 to translate forward. Hence, power must be applied to motor 44 in order to move heads 61 forward to interface with data-storage cartridge 10. The power for motor 44 is controlled by microprocessor 35 and electrical circuit 23 on the selective basis described in detail above. In general, microprocessor 35 and circuit 23 will not power motor 44 if a foreign object is inserted in disk drive 18, as explained previously. Consequently, trolley 50 will not move and heads 61 cannot interface with the foreign object under these circumstances. This arrangement prevents potential damage to heads 61 and other components within drive 18 caused by operating drive 18 in the presence of a foreign object.

Figure 10:
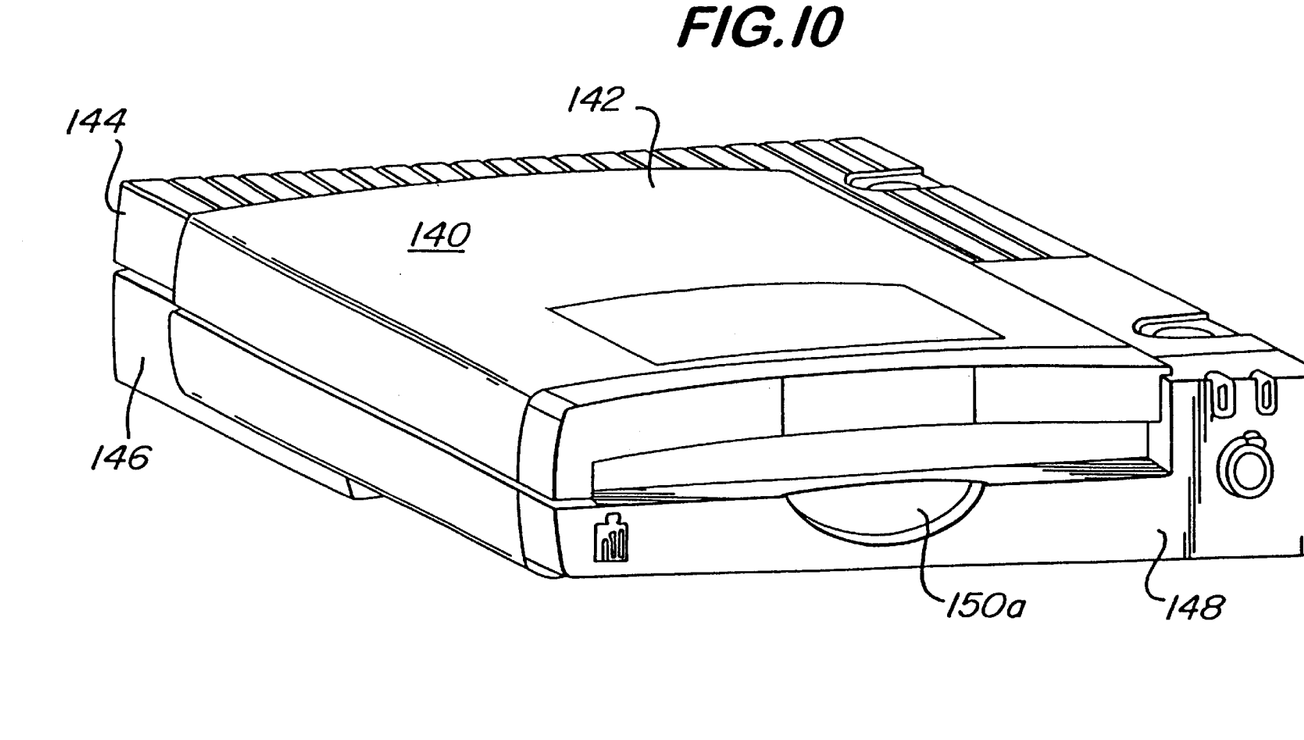
FIG. 10 is a top perspective view of an alternative embodiment of a disk drive in accordance with the present invention.
Figure 11:
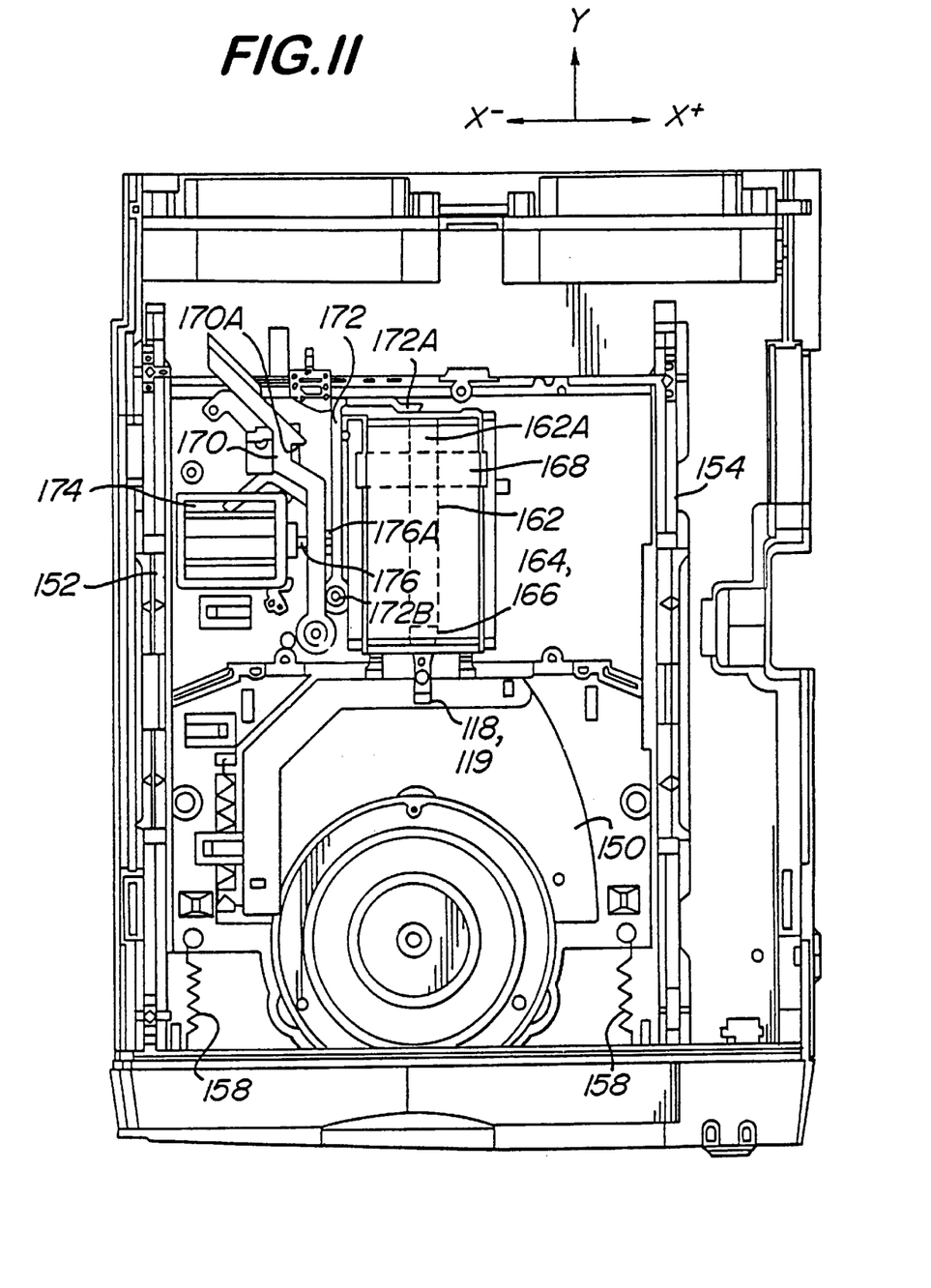
FIG. 11 is a top plan view of the disk drive shown in FIG. 10.

Another preferred embodiment of the invention is illustrated in FIGS. 10 and 11. FIGS. 10 and 11 illustrate a disk drive 140. Drive 140 utilizes electrical circuit 23, emitter 21, and detector 22 as described above in connection with disk drive 18, i.e., electrical circuit 23, emitter 21, and detector 22 prevent drive 140 from operating when a foreign object has been inserted into drive 140.

Disk drive 140 comprises an outer housing 142. Housing 142 has a top cover 144, a bottom cover 146, and a front panel 148. Data-storage cartridge 10 is inserted into drive 140 through a horizontal opening 150a in front panel 148. Disk drive 140 comprises an internal platform 150. Platform 150 is mounted on opposing rails 152 and 154, and slides between a forward position and a rearward position. Springs 158 bias platform 150 in its forward position.

A linear actuator is mounted on the rear of platform 150. The linear actuator comprises a carriage assembly 162 having two lightweight flexible arms 164 and 166. Recording heads 118 and 119 are mounted at an end of arms 164 and 166, respectively. Drive 140 includes a voice coil motor having a coil 168. Coil 168 is mounted at an opposing end of carriage 162 from arms 164 and 166. Coil 168 interacts with magnets (not shown) to move the carriage linearly, thereby causing recording heads 118 and 119 to move radially in relation to the recording surface of cartridge 10.

A head-locking lever 172 is pivotally mounted on platform 150 about a rotation shaft 172b. A second spring (not shown) is coupled to lever 172 at rotation shaft 172b. The second spring biases lever 172 in the X+ direction. An end 172a of lever 172 extends at a right angle to the main shaft of lever 172. End 172a is adapted to releasably engage an end 162a of carriage assembly 162 when assembly 162 is in a fully retracted position. The engagement of ends 172a and 162a locks carriage 162 in place, and prevents movement of recording heads 118 and 119.

Disk drive 140 also includes a solenoid 174 having a drive shaft 176. Solenoid 174 is selectively activated by an electrical current. Activation of solenoid 174 causes drive shaft 176 to move in the X+ direction, i.e., away from its normally extended position and toward a retracted position. An enlarged operating end 176a of drive shaft 176 engages head-locking levers 170 and 172 as shaft 176 moves in the X+ direction. End 176a pulls levers 170 and 172 in the X+ direction, against their normal spring bias, as drive shaft 176 moves toward its retracted position. Movement of lever 172 in the X+ direction causes end 172a of lever 172 to disengage from end 162a of carriage 162, thereby unlocking actuator carriage 162. Movement of lever 170 in the X+ direction causes a cutout 170a on lever 170 to disengage from latch projection 178, thereby releasing platform 150 and allowing platform 150 to return to its forward position.

Electrical circuit 23 is coupled to solenoid 174. Electrical circuit 23, emitter 21, and detector 22 operate as described above with regard to disk drive 18 to determine whether a compatible data-storage cartridge such as cartridge 10 is present in drive 140. Electrical circuit 23 causes electrical current to be directed to solenoid 174 when circuit 23 detects the presence of a compatible data-storage cartridge. Activation of solenoid 174 causes solenoid 174 to unlock heads 118 and 119 in the above-described manner, thereby permitting heads 118 and 119 to interface with data-storage cartridge 10.

The present invention provides substantial advantages in relation to common cartridge-detection systems. For example, the enhanced ability of drives 18 and 140 to discriminate between compatible data-storage cartridges and foreign objects makes drives 18 and 140 substantially less susceptible to damage caused by operating drives 18 and 140 in the presence of foreign objects. The invention provides this advantage without increasing the form factor of drives 18 or 140, and with minimal increases in the cost and complexity of drives 18 and 140. In particular, the invention does not necessitate the use of any additional circuitry or hardware (other than polarizing elements 21a and 22a) in relation to common cartridge-detection systems, and the polarizing material needed to implement the invention is relatively inexpensive.

It is to be understood that, even though numerous characteristics and advantages of the present invention have been set forth in the foregoing description, together with details of the structure and function of the invention, this disclosure is illustrative only. Changes may be made to detail, especially in matters of shape, size, and arrangement of parts within the principles of the invention, to the full extent indicated by the broad general meaning of the terms in which the appended claims are expressed. For example, disk drives 18 and 140 and data-storage cartridge 10 have been described in detail for illustrative purposes only. The invention is not limited to use with drives 18 and 140 and cartridge 10; the invention can be utilized with disk drives and data-storage cartridges of all types including, for example, disk drives that comprise rotary actuators, and optical data-storage media.

Furthermore, alternative embodiments of the invention may forgo the use of a polarizing filter between emitter 21 and marker 11, i.e., alternative embodiments may forgo the use of polarizing element 21a of the exemplary embodiment. This polarizing filter linearly polarizes the light generated by emitter 21, as noted previously. In particular, the filter polarizes the light generated by emitter 21 so that the light incident upon marker 11 has a predetermined polarization angle. This effect can be achieved by utilizing a polarized light source, e.g., a laser diode, in emitter 21. The source of polarized light can be oriented so that the light generated by emitter 21 has a predetermined polarization angle upon reaching marker 11, thereby obviating the need for a polarizing filer between emitter 21 and marker 11.

What is claimed is:

1. A disk drive comprising:

a source of polarized light; and a detector being in selective optical communication with said source of polarized light, said detector detecting polarized light having predetermined characteristics, wherein said source of polarized light emits polarized light having a first polarization angle, said detector is adapted to respond maximally to polarized light having a second polarization angle, and said first and second polarization angles are offset by approximately fifty degrees.

2. The disk drive of claim 1, wherein said detector comprises a polarizing filter, said polarizing filter being in selective optical communication with said source of polarized light.

3. The disk drive of claim 2, wherein said source of polarized light emits polarized light having a first polarization angle and said polarizing filter is adapted to maximally transmit polarized light having a second polarization angle.

4. The disk drive of claim 2, wherein said polarized light has a wavelength within a range of approximately 400 nanometers to 1100 nanometers.

5. The disk drive of claim 4, wherein said polarizing filter has a spectral bandwidth within a range of approximately 400 nanometers to 1100 nanometers.

6. The disk drive of claim 1, wherein said source of polarized light comprises a light-emitting diode.

7. The disk drive of claim 1, wherein said source of polarized light comprises a polarizing filter.

8. The disk drive of claim 1, wherein said polarized light has a wavelength within a range of approximately 400 nanometers to 1100 nanometers.

9. The disk drive of claim 1, wherein said disk drive is adapted to receive a data-storage cartridge having a retro-reflective marker, said retro-reflective marker placing said source of polarized light and said detector in optical communication when said disk drive receives said data-storage cartridge, said retro-reflective marker rotating a polarization angle of said polarized light emitted by said source of polarized light from said first polarization angle to approximately said second polarization angle.

10. A disk drive comprising:

a source of polarized light;

a detector being in selective optical communication with said source of polarized light, said detector detecting polarized light having predetermined characteristics:

a data-transducing head for interfacing with a data-storage cartridge inserted into said drive;

a head-retraction system having an actuator for positioning said data-transducing head proximate said data-storage cartridge; and an electrical circuit for controlling the operation of said head-retraction system, wherein said data-storage cartridge comprises a reflective marker and said head-retraction system is activated by said electrical circuit when said data-storage cartridge is inserted into said disk drive so that said reflective marker optically couples said source of polarized light and said detector.

11. The disk drive of claim 10, wherein said reflective marker rotates a polarization angle of said polarized light by a predetermined amount.

12. The disk drive of claim 10, wherein said reflective marker comprises a birefringent plastic film disposed on a surface of said reflective marker.

13. A data-storage system, comprising:

a disk drive comprising a source of polarized light and a light detector; and a data-storage cartridge adapted for insertion into said disk drive, said data-storage cartridge comprising a reflective marker, said reflective marker forming an optical path between said source of polarized light and said light detector when said data-storage cartridge is inserted into said disk drive.

14. The data-storage system of claim 13, wherein said source of polarized light emits polarized light having a first polarization angle and said light detector is adapted to respond maximally to polarized light having a second polarization angle.

15. The data-storage system of claim 14, wherein said reflective marker rotates a polarization angle of said light emitted by said source of polarized light from said first polarization angle to approximately said second polarization angle.

16. The data-storage system of claim 15, wherein said reflective marker is a retro-reflective marker.

17. The data-storage system of claim 16, wherein said first and second polarization angles are offset by approximately fifty degrees.

18. The data-storage system of claim 13, wherein said light detector comprises a polarizing filter, said reflective marker forming an optical path between said source of polarized light and said polarizing filter when said data-storage cartridge is inserted into said disk drive.

19. The data-storage system of claim 18, wherein said source of polarized light emits polarized light having a first polarization angle and said polarizing filter is adapted to maximally transmit polarized light having a second polarization angle.

20. The data-storage system of claim 19, wherein said reflective marker rotates a polarization angle of said polarized light emitted by said source of polarized light from said first polarization angle to approximately said second polarization angle.

21. The data-storage system of claim 13, wherein said disk drive further comprises:

a data-transducing head for interfacing with said data-storage cartridge;

a head-retraction system having an actuator, said actuator being mechanically coupled to said data-transducing head; and an electrical circuit electrically coupled to said light detector and said head-retraction system, said electrical circuit being responsive to said light detector so that said electrical circuit activates said head-retraction system when said light detector detects an amount of polarized light that is greater than a predetermined threshold, thereby enabling said data-transducing head to interface with said data-storage cartridge.

22. The data-storage system of claim 21, wherein said source of polarized light emits polarized light having a first polarization angle and said light detector is adapted to respond maximally to polarized light having a second polarization angle.

23. The data-storage system of claim 22, wherein said reflective marker rotates a polarization angle of said polarized light emitted by said source of polarized light from said first polarization angle to approximately said second polarization angle so that an amount of polarized light reaching said detector is above said predetermined threshold.

24. The data-storage system of claim 13, wherein said reflective marker comprises a birefringent-plastic film disposed on a surface of said reflective marker.

25. A method for detecting the presence of a data-storage cartridge in a disk drive, comprising the steps of:

directing polarized light at a reflective marker disposed on said cartridge;

measuring an amount of said polarized light that is reflected by said reflective marker; and determining whether said amount of said polarized light that is reflected by said reflective marker exceeds a predetermined threshold.

26. The method of claim 25, further comprising the step of activating a head-retraction system when said amount of polarized light that is reflected by said reflective marker exceeds said predetermined threshold.

27. The method of claim 25, wherein the step of directing polarized light at a reflective marker disposed on said data-storage cartridge comprises the step of directing said polarized light at said reflective marker so that said reflective marker rotates a polarization angle of said polarized light by a predetermined amount.

* * * * *